(12) United States Patent
Lee et al.

(10) Patent No.: US 8,208,209 B2
(45) Date of Patent: Jun. 26, 2012

(54) LENS ARRANGEMENT AND LENS MODULE USING SAME

(75) Inventors: Chai-Wei Lee, Taipei Hsien (TW); Yuan-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 61 days.

(21) Appl. No.: 12/761,365

(22) Filed: Apr. 15, 2010

(65) Prior Publication Data

US 2011/0096418 A1    Apr. 28, 2011

(30) Foreign Application Priority Data

Oct. 23, 2009   (CN) .......................... 2009 1 0308748

(51) Int. Cl.
*G02B 7/02* (2006.01)
(52) U.S. Cl. ...................................... 359/819; 359/811
(58) Field of Classification Search .................. 359/811, 359/813, 819, 822
See application file for complete search history.

(56) References Cited

U.S. PATENT DOCUMENTS

| 5,966,167 A * | 10/1999 | Nose et al. ...................... 348/59 |
| 2005/0068456 A1 * | 3/2005 | Ohta et al. ...................... 348/360 |

* cited by examiner

*Primary Examiner* — Joseph P Martinez
*Assistant Examiner* — Brandi Thomas
(74) *Attorney, Agent, or Firm* — Altis Law Group, Inc.

(57) ABSTRACT

A lens arrangement includes two lenses. Each lens includes an optical portion having an optical axis, a non-optical portion surrounding the optical portion, and an engagement portion extending along and inclining relative to the optical axis from the non-optical portion. The engagement portions of the lenses are engaged with each other and an included angle is defined between the engagement portions. One of the lenses includes an elastic element which can be flexibly deformed relative to the other lens.

15 Claims, 4 Drawing Sheets

LENS ARRANGEMENT AND LENS MODULE USING SAME

BACKGROUND

1. Technical Field

This present disclosure relates to lenses, and particularly, to a lens arrangement and a lens module using same.

2. Description of Related Art

Engaging lens modules often include a first annulus protruding from a first lens and a second annulus protruding from a second lens. The inner diameter of the first annulus is equal to the outer diameter of the second annulus, thus, the second annulus can be precisely engaged in the first annulus. Injection molding is often used to form the first annulus and the second annulus. However, it is difficult to precisely mold such annuluses, and an extremely high molding pressure is required to mold the annuluses. This causes a plurality of angle deformations that can interfere with the cooperation of the first annulus with the second annulus.

Therefore, it is desirable to provide a lens arrangement and a lens module, which can overcome or at least alleviate the above-mentioned limitations.

DETAILED DESCRIPTION

Figure 1:
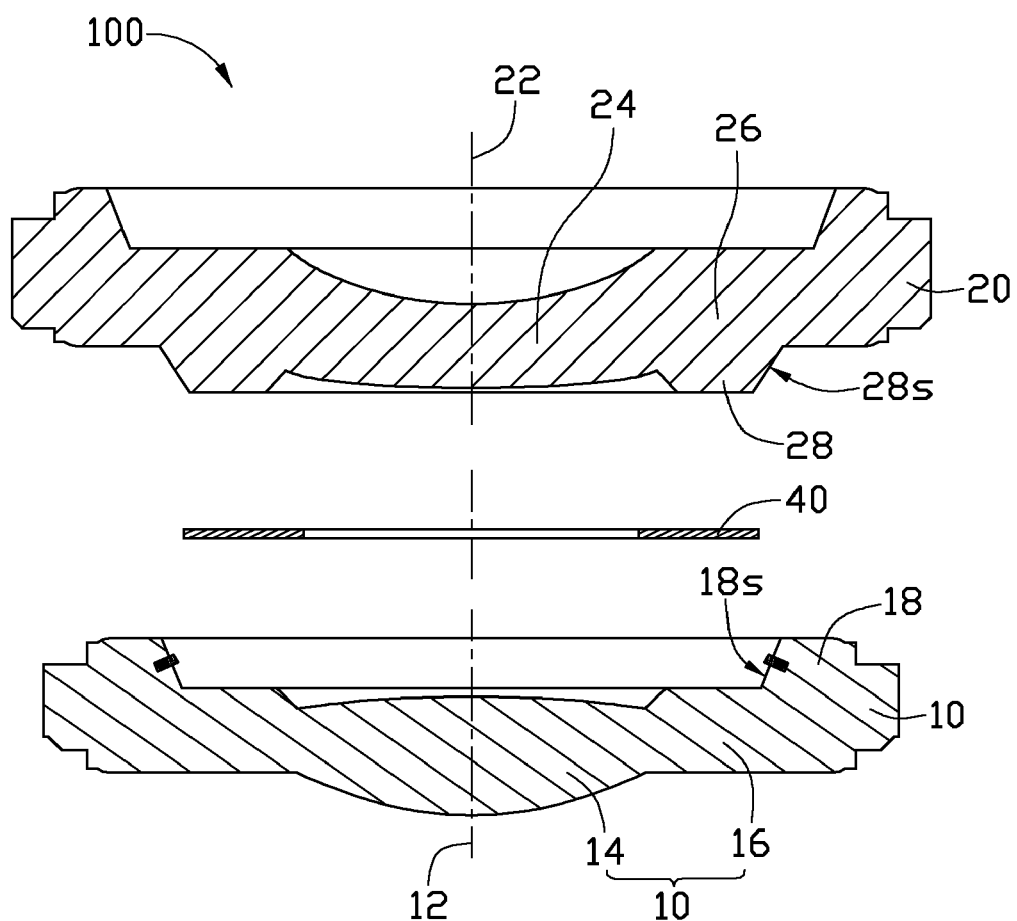
FIG. 1 is a cross-sectional, exploded view of a lens arrangement, according to an exemplary embodiment.
Figure 2:
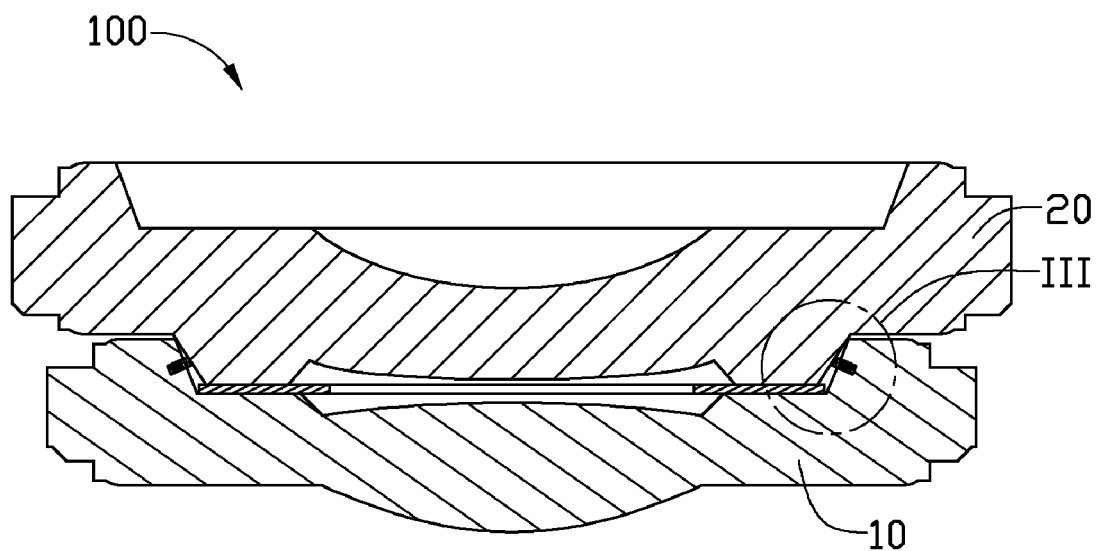
FIG. 2 is a cross-sectional, assembled view of the lens arrangement of FIG. 1.

Referring to FIG. 1, a lens arrangement 100, according to an exemplary embodiment, includes a first lens 10 and a second lens 20.

The first lens 10 and the second lens 20 can be plastic or glass lenses. In the present disclosure, both of the first lens 10 and the second lens 20 are plastic lenses.

The first lens 10 includes a first non-optical portion 16 surrounding a first optical portion 14. The first optical portion 14 is configured for refracting incident light rays and forming corresponding optical images, and defines a first optical axis 12. The first non-optical portion 16 is configured for engaging with the second lens 20. The first lens 10 further includes a first engagement portion 18 protruding along a direction substantially parallel to the first optical axis 12. The first engagement portion 18 is substantially annular and symmetrical about the first optical axis 12. The first engagement portion 18 includes an inner circumferential engagement surface 18s. In the present disclosure, the inner circumferential engagement surface 18s inclines radially outwards from the first non-optical portion 16.

The second lens 20 includes a second non-optical portion 26 surrounding a second optical portion 24. The second optical portion 24 is configured for refracting incident light rays and forming corresponding optical images, and defines a second optical axis 22. The second non-optical portion 26 is configured for engaging with the first lens 10. The second lens 20 also includes a second engagement portion 28 protruding along a direction parallel to the second optical axis 22. The second engagement portion 28 is substantially annular and symmetrical about the second optical axis 22. The second engagement portion 28 includes an outer circumferential engagement surface 28s for engaging with the inner circumferential engagement surface 18s. In the present disclosure, the outer circumferential engagement surface 28s radially inclines inwards from the second non-optical portion 26.

In alternative embodiments, the geometrical shape of the cross section of the engagement portion (the first engagement portion 18 and the second engagement portion 28) of each of the lenses (the first lens 10 and the second lens 20) along the optical axis is selected from the group consisting of a rectangle, a triangle, and a right-angled trapezoid.

Figure 3:
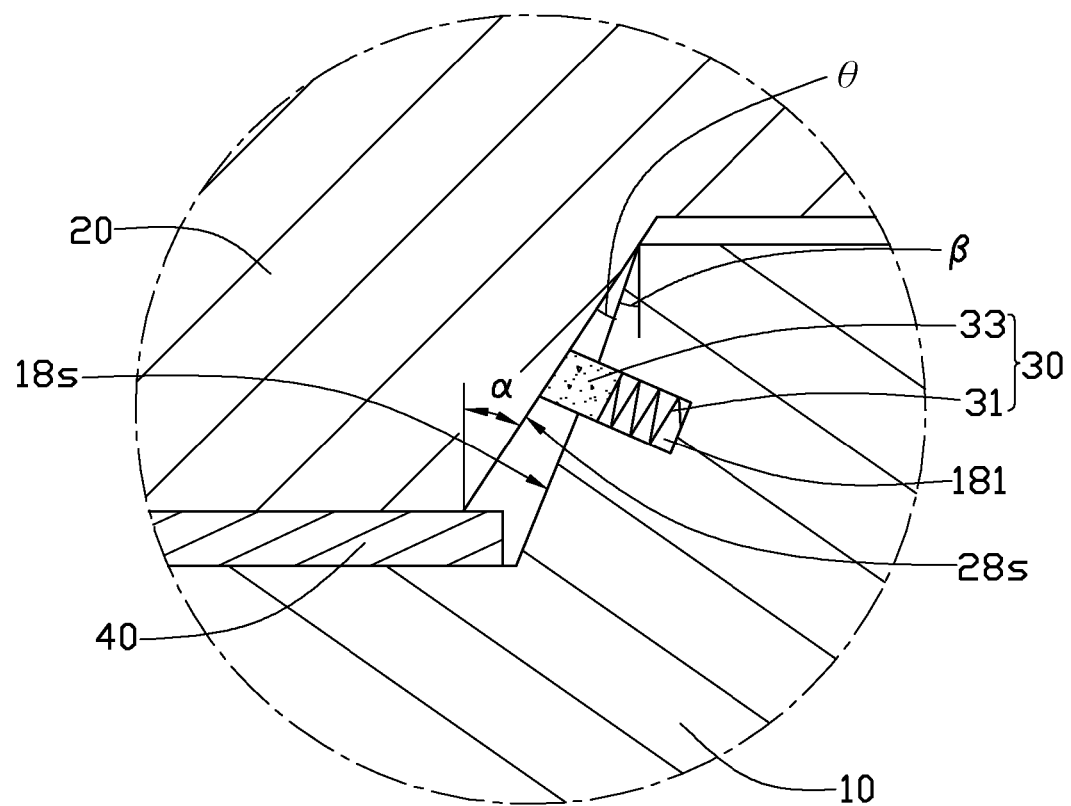
FIG. 3 is an enlarged view of portion III of FIG. 2.

Referring to FIG. 3, an example of an error in precision of molding is shown. A first included angle $\alpha$ between the inner circumferential engagement surface 18s and the first optical axis 12 is greater than a second included angle $\beta$ between the outer circumferential engagement surface 28s and the second optical axis 22. As such, when the first lens 10 is engaged with the second lens 20, a third included angle $\theta$ equal to a difference between the first included angle $\alpha$ and the second included angle $\beta$ is defined between the inner circumferential engagement surface 18s and the outer circumferential engagement surface 28s. The following explains in detail how the error is overcome using the lens arrangement 100.

The smallest diameter of the inner circumferential engagement surface 18s is equal to or less than the largest diameter of the outer circumferential engagement surface 28s, to ensure the first lens 10 can engage with the second lens 20.

The inner circumferential engagement surface 18s defines a number of grooves 181 equidistantly arranged along a circumferential direction thereof.

A number of elastic elements 30 are fixed in the respective grooves 181, and each elastic element 30 can be flexibly deformed along a direction perpendicular to the bottom of the corresponding groove 181. In detail, each of the elastic elements 30 includes a spring 31 and a shim 33 fixed on a distal end of the spring 31. In the present disclosure, the spring 31 is adhered to the bottom of the corresponding groove 181 and the shim 33 is adhered to the spring 31. A free length of the spring 31 is longer than a distance between the inner circumferential engagement surface 18s and the bottom of the corresponding groove 181. In order to avoid scratching the second lens 20, each of the elastic elements 30 is made either of a soft material, a very flexible material, or both.

Furthermore, an aperture stop 40 is disposed between the first engagement portion 18 and the second engagement portion 28 for imaging.

Upon assembly, the first engagement portion 18 slides along the second engagement portion 28 until the first engagement portion 18 is tightly engaged with the second engagement portion 28. Thus, the first lens 10 and the second lens 20 are tightly engaged with each other via friction between the inner circumferential engagement surface 18s and the outer circumferential engagement surface 28s. The elastic elements 30 are pressed by the second lens 20 to resist the first lens 10 with a resilience force. The first optical axis 12 is superposed on the second optical axis 22, constituting a common optical axis of the lens arrangement 100. As such, an alignment of the first lens 10 and the second lens 20 is achieved.

Due to the third included angle $\theta$ defined between the first lens 10 and the second lens 20, an angle deformation of the first engagement portion 18 and/or the second engagement portion 28 during molding is counteracted. Furthermore, due to the resilient force of the elastic elements 30, the first lens 10 and the second lens 20 can be engaged with each other more tightly.

It should be noted that the lens arrangement 100 can include more than two lenses. Each two adjacent lenses are engaged in a similar way as the first lens 10 and the second lens 20. In addition, the grooves 181 can also be defined in the outer circumferential engagement surface 28s while the elastic elements 30 are fixed thereto.

Further, cross sections of the first engagement portion 18 along the first optical axis 12 and the second engagement portion 28 along the second optical axis 22 can be rectangular, triangular, or right-angled trapezoid.

Figure 4:
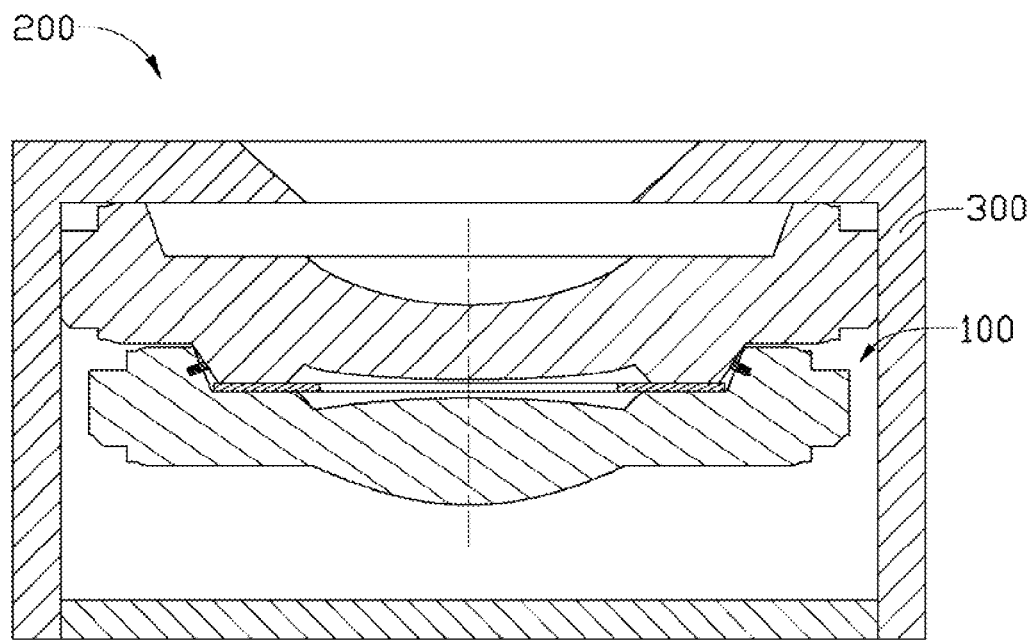
FIG. 4 is an assembled, cross-sectional view of a lens module, according to an exemplary embodiment.

Referring to FIG. 4, a lens module 200, according to an exemplary embodiment, includes the lens arrangement 100 and a lens barrel 300. The lens barrel 300 holds the lens arrangement 100.

While various exemplary and preferred embodiments have been described, it is to be understood that the disclosure is not limited thereto. Various modifications and similar arrangements can also be covered as would be apparent to those skilled in the art.

Therefore, the scope of the appended claims should be accorded the broadest interpretation so as to encompass all such modifications and similar arrangements.

What is claimed is:

1. A lens arrangement, comprising:
two lenses each comprising an optical portion having an optical axis, a non-optical portion surrounding the optical portion, and an engagement portion extending along and inclining relative to the optical axis from the non-optical portion, the engagement portions of the lenses being engaged with each other with an included angle and a corresponding gap being defined between the engagement portions; and
a plurality of elastic elements sandwiched between the engagement portions and striding the gap, the elastic elements being flexibly deformed between the engagement portions for facilitating the interengagement of the lenses.

2. The lens arrangement of claim 1, wherein the lenses are selected from the group consisting of plastic lenses and glass lenses.

3. The lens arrangement of claim 1, wherein the geometrical shape of the cross section of the engagement portion of each of the lenses along the optical axis is selected from the group consisting of an annulus, a rectangle, a triangle, and a right-angled trapezoid.

4. The lens arrangement of claim 1, wherein the engagement portions of the lenses are substantially annular and symmetrical about the optical axis.

5. The lens arrangement of claim 1, wherein the engagement portions comprise a first engagement portion protruding along a direction parallel to the optical axis, and a second engagement portion protruding along a direction parallel to the optical axis.

6. The lens arrangement of claim 5, wherein the first engagement portion further comprises an inner circumferential engagement surface extending radially and inclining outwards relative to the corresponding optical axis, the second engagement portion comprises an outer circumferential engagement surface for engaging with the inner circumferential engagement surface, and the outer circumferential engagement surface extends radially and inclines inwards relative to the corresponding optical axis.

7. The lens arrangement of claim 6, wherein the smallest diameter of the inner circumferential engagement surface is equal to or less than the largest diameter of the outer circumferential engagement surface.

8. The lens arrangement of claim 6, wherein the inner circumferential engagement surface defines a plurality of grooves equidistantly arranged along a circumferential direction thereof, the elastic elements are fixed in the respective grooves, and each elastic element is capable of being deformed along an extending direction of the corresponding groove.

9. The lens arrangement of claim 8, wherein each of the elastic elements comprises a spring and a shim fixed on a distal end of the spring, the spring is adhered to the bottom of the corresponding groove, and the shim is adhered to the spring and abuts on the outer circumferential engagement surface.

10. The lens arrangement of claim 9, wherein a free length of the spring is greater than a distance between the inner circumferential engagement surface and the bottom of the corresponding groove.

11. The lens arrangement of claim 1, wherein the elastic element is made either of a soft material, or a very flexible material, or both.

12. A lens module comprising:
a lens barrel; and
a lens arrangement held by the lens barrel, the lens arrangement comprising:
two lenses each comprising an optical portion having an optical axis, a non-optical portion surrounding the optical portion, and an engagement portion extending along the optical axis from the non-optical portion; the engagement portions of the lenses being engaged with each other with an included angle and a corresponding gap being defined between the engagement portions; and
a plurality of elastic elements sandwiched between the engagement portions and striding the gap, the elastic elements being flexibly deformed between the engagement portions for facilitating the interengagement of the lenses.

13. The lens module of claim 12, wherein one of the engagement portions further comprises an inner circumferential engagement surface extending radially and inclining outwards relative to the corresponding optical axis, the other engagement portion comprises an outer circumferential engagement surface for engaging with the inner circumferential engagement surface, the outer circumferential engagement surface extends radially and inclines inwards relative to the corresponding optical axis.

14. The lens module of claim 13, wherein the inner circumferential engagement surface defines a plurality of grooves equidistantly arranged along a circumferential direction thereof, and the elastic elements are fixed in the respective grooves and capable of being deformed along an extending direction of the corresponding grooves.

15. The lens module of claim 14, wherein each of the elastic elements comprises a spring and a shim fixed on a distal end of the spring, the spring is adhered to the bottom of the corresponding groove, and the shim is adhered to the spring and abuts on the outer circumferential engagement surface.

* * * * *